United States Patent [19]
Unsworth et al.

[11] Patent Number: 5,627,447
[45] Date of Patent: May 6, 1997

[54] METHOD AND APPARATUS FOR DETECTING CURRENT DELAY ANGLE FROM MOTOR TERMINAL VOLTAGE

[75] Inventors: Peter J. Unsworth, East Sussex, England; Jinghan Tao, Shorewood, Wis.

[73] Assignee: Allen-Bradley Company, Inc., Milwaukee, Wis.

[21] Appl. No.: 536,728

[22] Filed: Sep. 29, 1995

[51] Int. Cl.⁶ .................................................. H02P 5/40
[52] U.S. Cl. .................. 318/801; 318/810; 318/138; 318/254
[58] Field of Search ............................. 318/799–832, 318/138, 245, 254, 439; 363/40, 39, 41, 42

[56] References Cited

U.S. PATENT DOCUMENTS

| | | | |
|---|---|---|---|
| 4,356,525 | 10/1982 | Komrumpf et al. | 361/4 |
| 4,369,403 | 1/1983 | Lee | 318/729 |
| 5,245,256 | 9/1993 | Cassat et al. | 318/254 |
| 5,341,080 | 8/1994 | Agut Sanz | 318/778 |
| 5,367,234 | 11/1994 | DiTucci | 318/254 |
| 5,378,976 | 1/1995 | Inaji et al. | 318/810 |
| 5,471,127 | 11/1995 | Vaughan et al. | 318/809 |
| 5,495,918 | 3/1996 | Peruggi et al. | 187/316 |
| 5,510,689 | 4/1996 | Lipo et al. | 318/809 |
| 5,530,248 | 4/1996 | Peruggi et al. | 187/316 |
| 5,541,484 | 7/1996 | DiTucci | 318/254 |

*Primary Examiner*—Paul Ip
*Attorney, Agent, or Firm*—Michael A. Jaskolski; John M. Miller; John J. Horn

[57] ABSTRACT

A method and apparatus to be used with an inverter based motor controller for determining current phase angles for the current on a single phase of a three phase AC motor from an inverter generated high frequency phase voltage sequence. The invention detects turn on delay periods and compares phase voltages during consecutive turn on delay periods to determine phase current zero crossing times which can be used along with phase voltage zero crossing times to derive current phase angle information.

15 Claims, 5 Drawing Sheets

METHOD AND APPARATUS FOR DETECTING CURRENT DELAY ANGLE FROM MOTOR TERMINAL VOLTAGE

FIELD OF THE INVENTION

The present invention relates to a method and apparatus for determining a current angle or power factor angle and particularly to a method and apparatus for determining such an angle from a motor terminal voltage produced by a motor controller including a pulse width modulating inverter.

STATE OF THE ART

One type of commonly designed induction motor is a three phase motor having three Y connected stator windings. In this type of motor, each stator winding is connected to an AC voltage source by a separate supply line, the source generating currents therein. Often, an adjustable speed drive (ASD) will be positioned between the voltage source and the motor to control motor speed.

Figure 1:
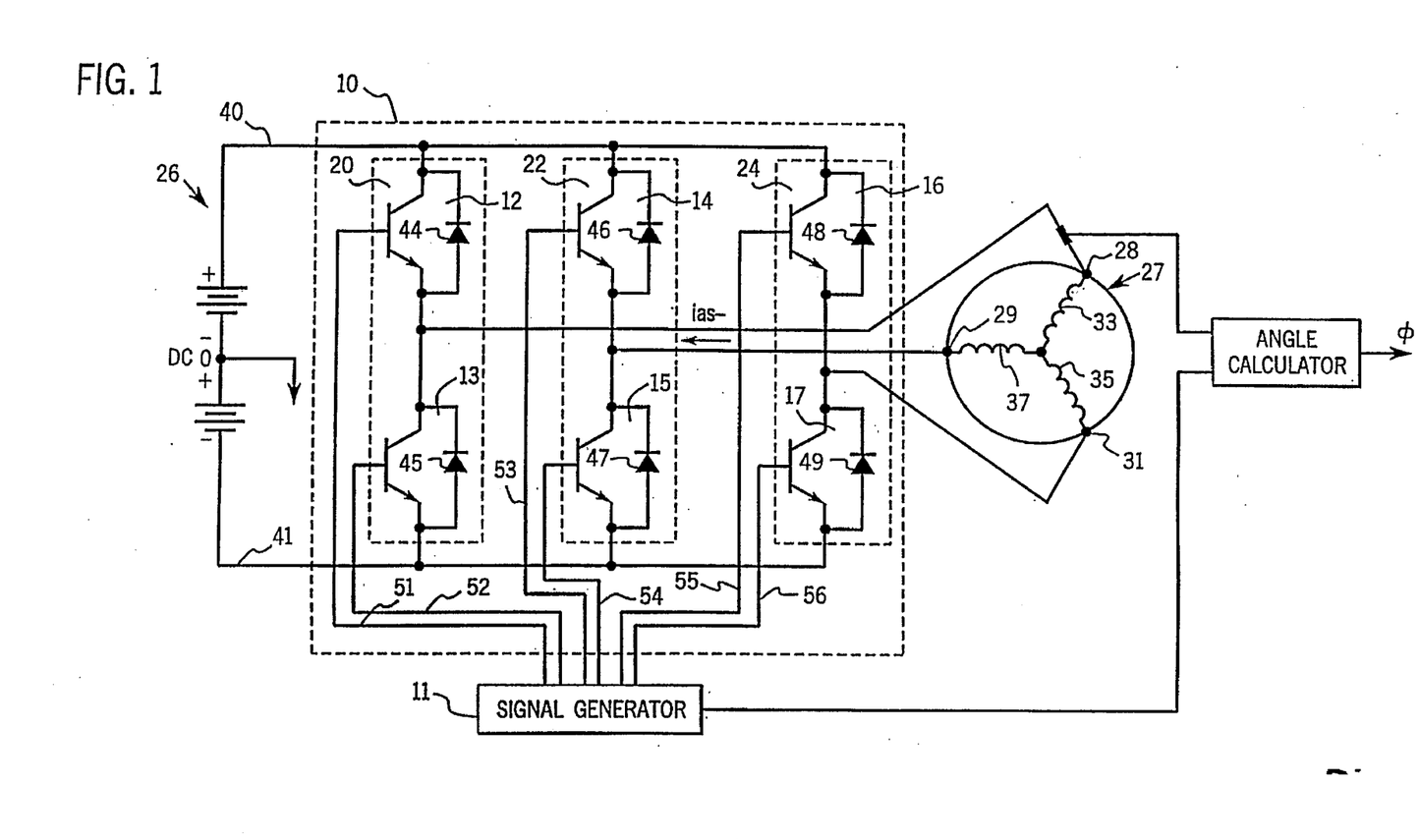
FIG. 1 is a schematic diagram of a motor controller and a signal generator incorporating the present invention.

Many ASD configurations include a pulse with modulated (PWM) inverter consisting of a plurality of switching devices. Referring to FIG. 1, an exemplary inverter 10 has six switches, 12–17. The switches 12–17 are arranged in series pairs, each pair forming one of three inverter legs 20, 22, and 24. Referring to leg 20, by turning the switches 12, 13 ON and OFF in a repetitive sequence, leg 20 receives DC voltage 26 and provides a high frequency pulse train to a motor terminal 28 connected between switches 12 and 13.

Figure 2:
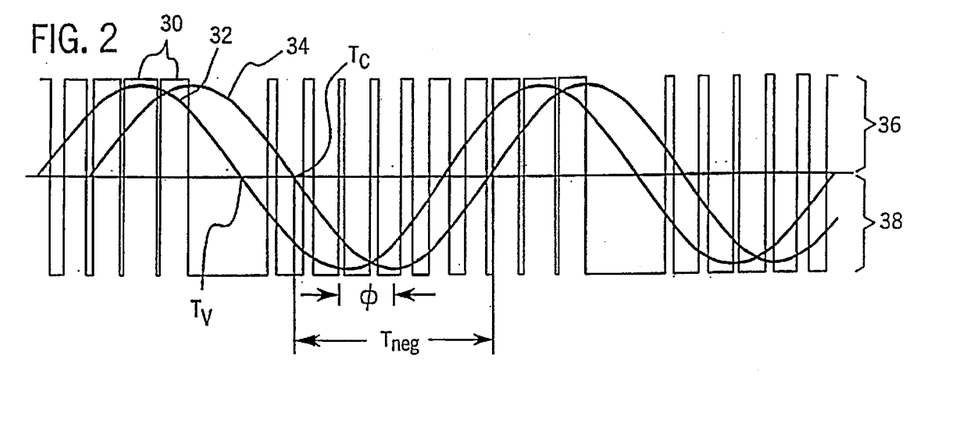
FIG. 2 is a graph illustrating the high frequency pulses and the resulting low frequency alternating voltage applied to a stator winding by a PWM inverter.

Referring also to FIG. 2, an exemplary sequence of high frequency terminal voltage pulses 30 that an inverter might provide to a motor terminal 28 can be observed along with an exemplary low frequency alternating fundamental voltage 32 and resulting alternating current 34. By varying the widths of the positive portions 36 of each high frequency pulse relative to the widths of the negative portions 38 over a series of high frequency voltage pulses 30, a changing average voltage which alternates can be generated. The changing average voltage defines the low frequency alternating voltage 32 that drives the motor. The low frequency alternating voltage 32 in turn produces a low frequency alternating current 34 that lags the voltage by a phase angle Φ.

Ideally, the switches 12–17 used to construct an inverter would have instantaneous turn ON and turn OFF times. In reality, however, referring still to FIG. 1, each switch 12, 13 has turn ON and turn OFF times that vary depending on the technology used for their construction. Thus, while signals to turn the upper switch 12 ON and the lower switch 13 OFF might be given at the same instant, the lower switch 13 may go ON faster than the upper switch 12 goes OFF thus providing an instantaneous DC short between a high DC rail 40 and a low DC rail 42. Such a DC short can cause irreparable damage to both the inverter and the motor components.

To ensure that the series switches of an inverter are never simultaneously ON, a turn on delay is introduced between the times when one switch turns OFF and the other switch turns ON. During these turn on delay periods, the inductive properties of the motor winding continue to draw from, or provide current to, a connected leg 20, 22, or 24. A current path is provided by shunt diodes 44–49 as well known in the art.

In motor controls many motor parameters are sampled or derived from other sampled parameters for corrective feedback purposes. Referring again to FIG. 2, one important motor parameter is the power factor or current angle Φ between a phase voltage and an associated current. The current angle Φ is important for compensating for voltage loss and wave form distortion which results from the turn on delay periods discussed above. In addition, the current angle Φ is useful for current measurement compensation, for detecting excitation balance between motor phases and detecting an unbalanced load in motor drives, and for facilitating various voltage auto boost methods at low speed. The current angle can be determined easily by using two sensors, one to determine current zero crossing points and another to determine voltage zero crossing points, the difference between two consecutive points being the current angle. Unfortunately, to minimize controller costs and physical size, many motor controllers only include one current sensor on a D.C. rail instead of two current sensors on the motor side of a drive which are typically required to determine the angle Φ. In this case, there is no easy way to assess the current angle Φ directly.

SUMMARY OF THE INVENTION

The present invention includes a method and an apparatus for determining current phase angles using only a single voltage detector. Thus, using hardware which already exists on small motor control drives, the present invention can provide the important current angle measure without the need for additional relatively expensive current sensing devices.

The inventive method is to be used with a motor controller having an inverter which provides a high frequency voltage sequence on each of three phases of an AC motor. The changing average value of the high frequency voltage sequence generates a low frequency alternating voltage and an associating alternating current which lags the alternating voltage by a current angle. The inverter is controlled by a series of triggering pulses which are characterized by turn on delay periods. The method includes the steps of sensing a high frequency voltage sequence on a single phase, identifying the occurrences of turn on delay periods on the single phase, and determining the current zero crossings from the polarity of the high frequency voltage sequence during the turn on delays.

Thus, one object of the invention is to provide the current delay angle on a single phase of a three phase motor without needing additional sensing components. Typical motor controllers include a voltage sensor and a triggering means for driving an inverter. Thus, by using the signals which already exist within an inverter based motor controller, the current angle can easily be ascertained.

In order to eliminate possible DC short circuits between positive and negative DC rails, series inverter switches are fired such that a turn on delay period exists between the times when one switch in a series pair turns OFF and the other switch in the pair turns ON. During the turn on delay periods, the inductive properties of the motor windings continue to either draw current from or provide current to its associated leg. Referring to FIG. 1, turn on delay currents flow through one or the other shunt diode connecting the winding to either the positive or the negative DC rail. Which DC rail is connected to the winding during the turn on delay depends upon whether or not the inductive winding is supplying or receiving current during the delay period.

Referring still to FIG. 1, where terminal current at terminal 28 is positive and the stator winding requires current from leg 20, current is drawn through lower diode 45, and terminal 28 is connected to the negative DC bus, and terminal voltage at 28 is instantaneously low. In the alternative, where terminal current at terminal 28 is negative meaning current is being supplied to leg 20, current passes through upper diode 44, terminal 28 is connected to the positive DC bus, and terminal voltage is instantaneously high.

Hence, by monitoring the instantaneous terminal voltage during turn on delay periods, phase current polarity can be determined. By storing the time at which the current polarity changes between two consecutive delay periods, current zero crossings can be determined. Once a current zero crossing is determined, the current phase angle can easily be calculated.

Yet another object it to provide an accurate current phase angle at minimal cost. The present invention can be implemented nearly entirely using existing controller components and computing capability. This is particularly important in low cost controllers where an additional current means would likely be cost prohibitive.

The step of identifying the occurrences of turn on delay periods includes the step of determining when each of the upper and lower signals associated with the monitored phase are low. In one embodiment, the states of the signals are determined using a simple digital NOR gate, the output of which is high only when both inputs are low. Thus, even where additional hardware may be required, required hardware is simple and well known, facilitating cost effective and easy implementation.

Other and further aspects of the present invention become apparent during the course of the following description and by reference to the accompanying drawings.

DETAILED DESCRIPTION AND PREFERRED EMBODIMENTS

The present invention will be described in the context of the exemplary PWM inverter 10 shown in FIG. 1. The inverter 10 is shown connected to a signal generator 11, a DC voltage source 26 and a motor 27. The inverter consists of six solid state switching devices 12–17 (BJT, GTO, IGBT or other transistor technology devices may be used) arranged in series pairs. Each switching device 12–17 being coupled with an inverse parallel connected diode 44-49. Each series arranged pair of switching devices 12 and 13, 14 and 15 and 16 and 17, make up a separate leg 39, 40 or 41 of the inverter 10 and have a common node which is electrically connected to a unique motor terminal 30, 31 or 32 (and thus to a unique stator winding 35, 36, or 37). Each switching device 12-17 is also electrically connected by a firing line 51-56 to the signal generator 11. A split DC voltage source 26 creates a high voltage rail 40 and a low voltage rail 41 and each leg 20, 22, 24 connects the high voltage rail 40 to the low voltage rail 41.

To avoid repetitive disclosure, the PWM inverter 10 will be explained by referring only to leg 20 as all three legs 20, 22, and 24 of the inverter operate in the same manner. The signal generator 11 operates to turn the switching devices 12, 13 of leg 20 on and off in a repetitive sequence that alternately connects the high and low voltage rails 40, 41 to, and produces a series of high frequency voltage pulses at, terminal 28. The high frequency voltage pulses is averaged over a given period to produce a low frequency alternating voltage at terminal 28.

Referring to FIG. 2, the exemplary sequence of high frequency pulses 30 that an inverter 10 might provide to motor terminal 28 can be observed along with an exemplary low frequency alternating voltage 32. By varying the widths of the positive portions 36 of each high frequency pulse relative to the widths of the negative portions 38 over a series of pulses 30, a changing average value which alternates sinusoidally can be generated. The changing average value defines the low frequency alternating voltage 32 that drives the motor 27. As well known in the art, the low frequency alternating voltage 32 produces a terminal current 34 that lags the low frequency alternating voltage 32 by a phase angle Φ.

Figure 3A:
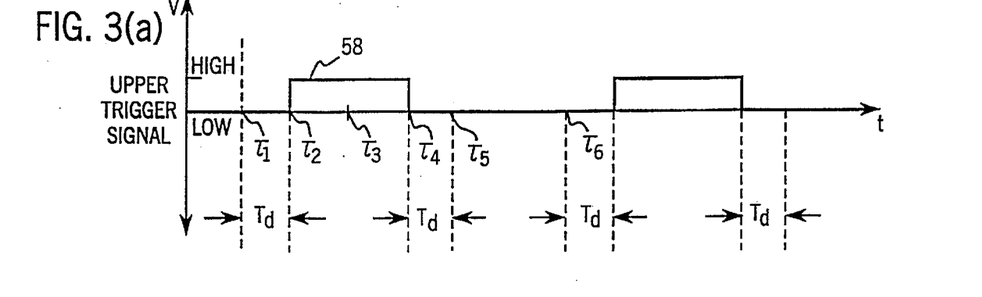
FIGS. 3(a) and 3(b) are graphs illustrating PWM firing pulses.
Figure 3B:
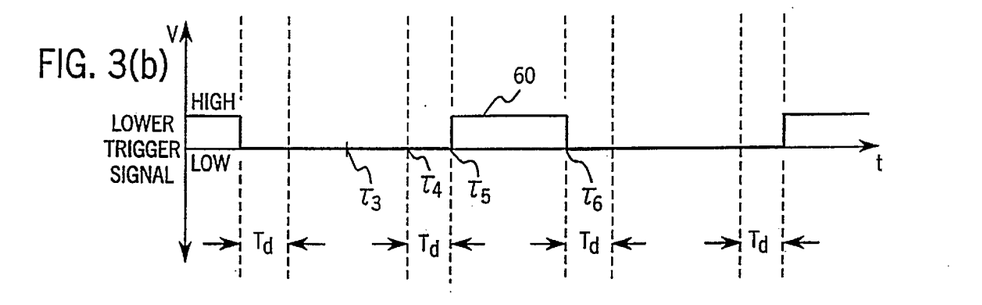

Referring also to FIGS. 3(a) and 3(b) an upper signal 58 and a lower signal 60 that control the upper and lower switches 12, 13 respectively can be observed. Due to switching device constraints, switches 12 and 13 can not be turned on and off instantaneously. Thus, to avoid DC shortage between the positive and negative rails 40, 41 due to series switches that are simultaneously on, the signal generator 11 provides firing pulses on lines 51, 52, then clued turn on delay periods $T_d$ in between the times at which one of the series switches 12, 13 goes off and the other series switch 12 or 13 is switched on. Thus, at time T=0, the lower trigger signal is high, the lower switch in FIG. 1 is closed, and therefore terminal 28 is connected to the negative rail 41. At time T=$\tau_1$, the lower trigger signal is low. From $\tau_1$ to $\tau_2$, during the turn on delay period $T_d$, both the upper and lower trigger signals remain low. However, after the turn on delay period $T_d$, the upper trigger signal 58 goes high, the upper switch 12 closes, and the terminal 28 is connected to the positive DC rail 40.

For the purposes of the present invention, the periods of interest are the turn on delay periods, where both the upper and lower trigger signals 58, 60 are low. During these turn on delay periods $T_d$, instead of following either the upper or lower trigger signals, the terminal voltage terminal 28 is determined by the polarity of the terminal current at terminal 28. Thus, during these turn on delay periods $T_d$, by sampling the terminal voltage at terminal 28, the controller can get a glimpse of terminal current polarity. In addition, by comparing terminal current polarities during consecutive turn on delay periods $T_d$, current zero crossings, or the times at which the terminal current changes polarity, can be accurately ascertained. Using this information, the current phase angle can be determined by subtracting the terminal voltage zero crossing time from the terminal current zero crossing time and converting the resulting period into degrees.

Referring again to FIG. 2, once consecutive voltage zero crossing $T_v$ and current zero crossing times $T_c$ are determined, the phase angle Φ (in degrees) can be determined according to the equation:

$$\Phi = (T_c - T_v) * 360 * F_v \quad (1)$$

where $F_v$ is the frequency of the command voltage in hertz.

Figure 5A:
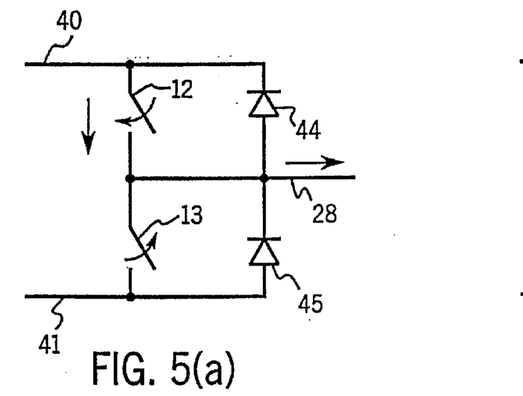
FIGS. 5(a)–5(f) are simplified schematics showing the operation of a single leg of the inverter of FIG. 1.
Figure 5B:
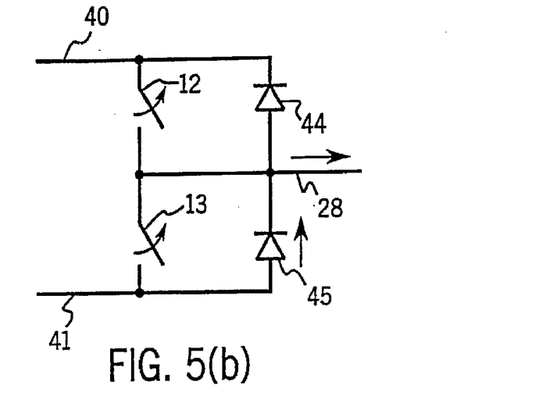
Figure 5C:
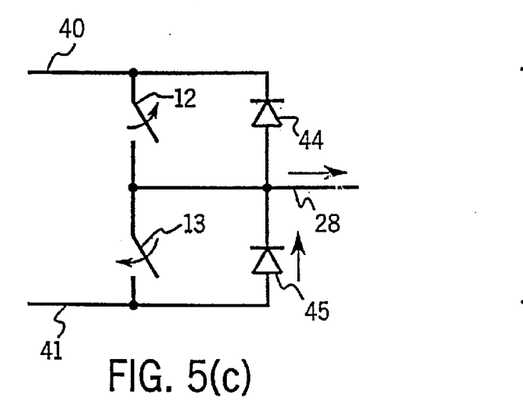
Figure 5D:
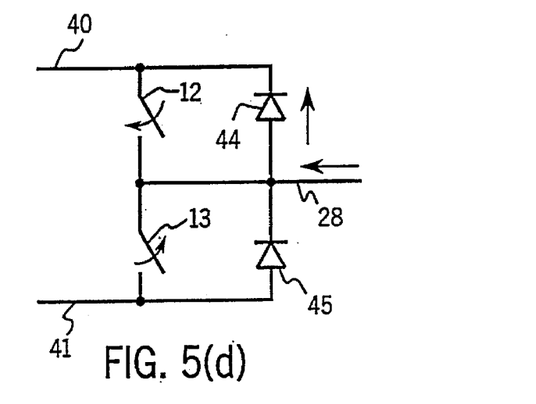
Figure 5E:
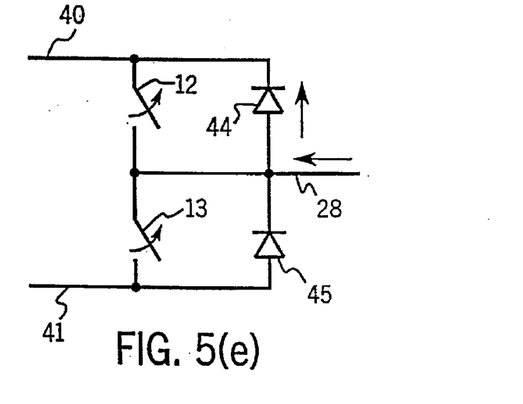

Referring now to FIGS. 5(a)–5(f), six separate schematics representing leg 20 under different conditions can be observed. In FIGS. 5(a)–5(c), the terminal or alternating current 34 observed in FIG. 2 is presumed to be positive. Thus, while the instantaneous terminal voltage 30 at terminal 28 may be either positive or negative in FIGS. 5(a)–5(c), the terminal current 34 remains positive. On the other hand, in FIGS. 5(d)–5(f), the terminal current is assumed to be negative flowing from terminal 28 into leg 20.

Figure 3C:
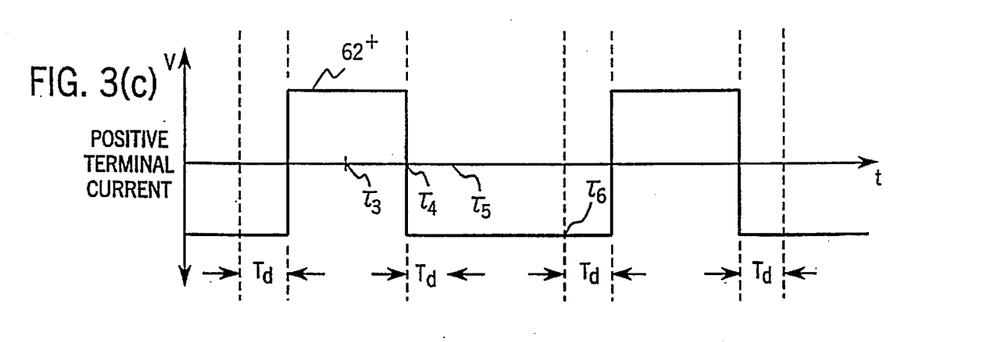
FIGS. 3(c) and 3(d) are graphs illustrating high frequency pulses delivered to a motor terminal.
Figure 3D:
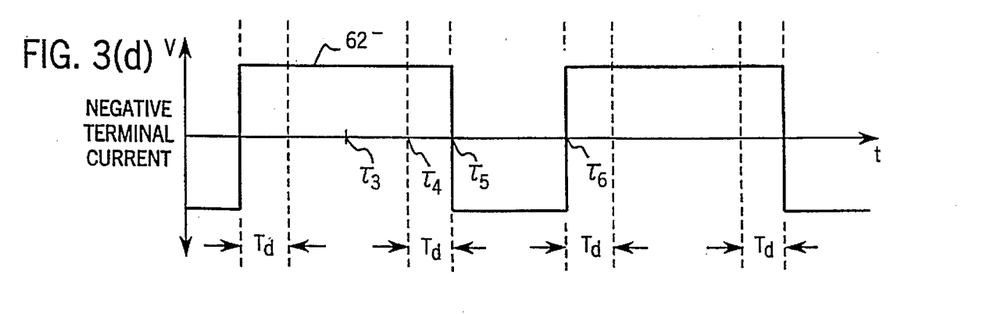

Referring now to FIGS. 3(a), 3(b) and 5(a), at time $\tau_3$ the upper trigger signal is high, the lower trigger signal is low, the upper switch 12 is closed, the lower switch 13 is open, and terminal 28 is connected to the positive DC bus 40. Referring also to FIGS. 3(c) and 3(d), regardless of whether or not the terminal current at terminal 28 is positive or negative, the high frequency voltage pulses $62^+$, $62^-$ at terminal 28 will be positive.

Referring to FIG. 5(b) at time $\tau_4$ the upper trigger signal goes low and both the upper and lower signals remain low for a turn on delay period $T_d$. During this delay period $T_d$, because of the inductive properties of the stator winding connected to terminal 28, the terminal current can not immediately reverse itself and therefore, the terminal current at terminal 28 remains positive drawing current from leg 20. As current is drawn from leg 20, the lower diode 45 becomes conducting and terminal 28 is connected to the negative DC bus 41. Referring again to FIG. 3(c), because the terminal current is positive in FIG. 5(b), the high frequency voltage pulse train $62^+$ goes negative and remains negative during the turn on delay period $T_d$.

Next, referring to FIG. 5(c), at time $\tau_5$, the lower trigger signal goes high which closes the lower switch 13 again connecting the terminal 28 to the negative DC bus 41. The terminal voltage at terminal 28 remains negative as long as the lower trigger signal 60 remains high. At time $\tau_6$ the lower trigger signal 60 again goes low and both the upper and lower trigger signals 58, 60 remain low during another turn on delay period $T_d$. As before, because the terminal current 34 at terminal 28 is still positive, as in FIG. 5(b) during this turn on delay $T_d$, terminal 28 is connected to the negative DC bus 41 through diode 45.

Now, referring to FIGS. 2, 3(a), 3(b) and 5(d) during the period $T_{neg}$, the terminal current 34 at terminal 28 is negative. During the $T_{neg}$ period, at $\tau_3$ again the upper trigger signal 58 is high, the lower trigger signal is low, the upper switch 12 is closed and the lower switch 13 is open. In this state, referring to FIG. 3(d), terminal current 34 at terminal 28 remains negative, and terminal 28 is connected to the positive DC bus 40 via diode 44 which conducts the current. At time $\tau_4$, the upper trigger signal 58 goes low and both the upper and lower trigger signals 58, 60 remain low during a turn on delay period $T_d$. During this turn on delay period $T_d$, referring to FIG. 5(e), both the upper and lower switches 12, 13 are open. However, referring now to FIG. 3(d), because the terminal current 34 is negative, current is flowing back from terminal 28 to leg 20. This current flow is blocked by diode 45 and diode 44 remains in a conducting state so that terminal 28 is connected to the positive DC rail 40.

Figure 5F:
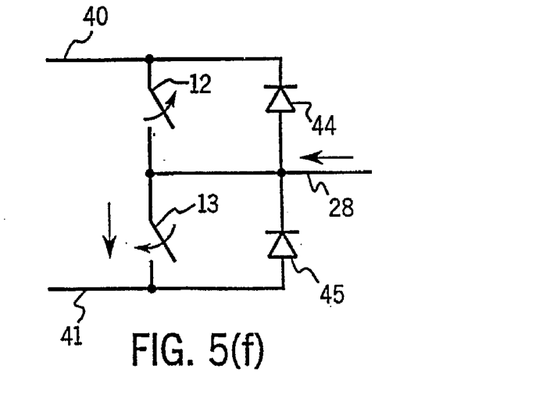

Next, referring to FIG. 5(f), at $\tau_5$, the lower trigger signal 60 goes positive which closes switch 13 and connects terminal 28 to the negative DC bus 41 thus forcing the high frequency terminal voltage pulse train $62^-$ to go negative.

Hence, it should be appreciated that during the turn on delay periods $T_d$, the high frequency terminal voltage pulse train indicates the terminal current polarity at terminal 28. For example, during any turn on delay period, when the terminal current 34 at terminal 28 is positive, the high frequency terminal voltage pulse train will be negative. Similarly, during any turn on delay period when the polarity of the terminal current is negative, the high frequency terminal voltage pulse train will be positive.

Figures 4A, 4B:
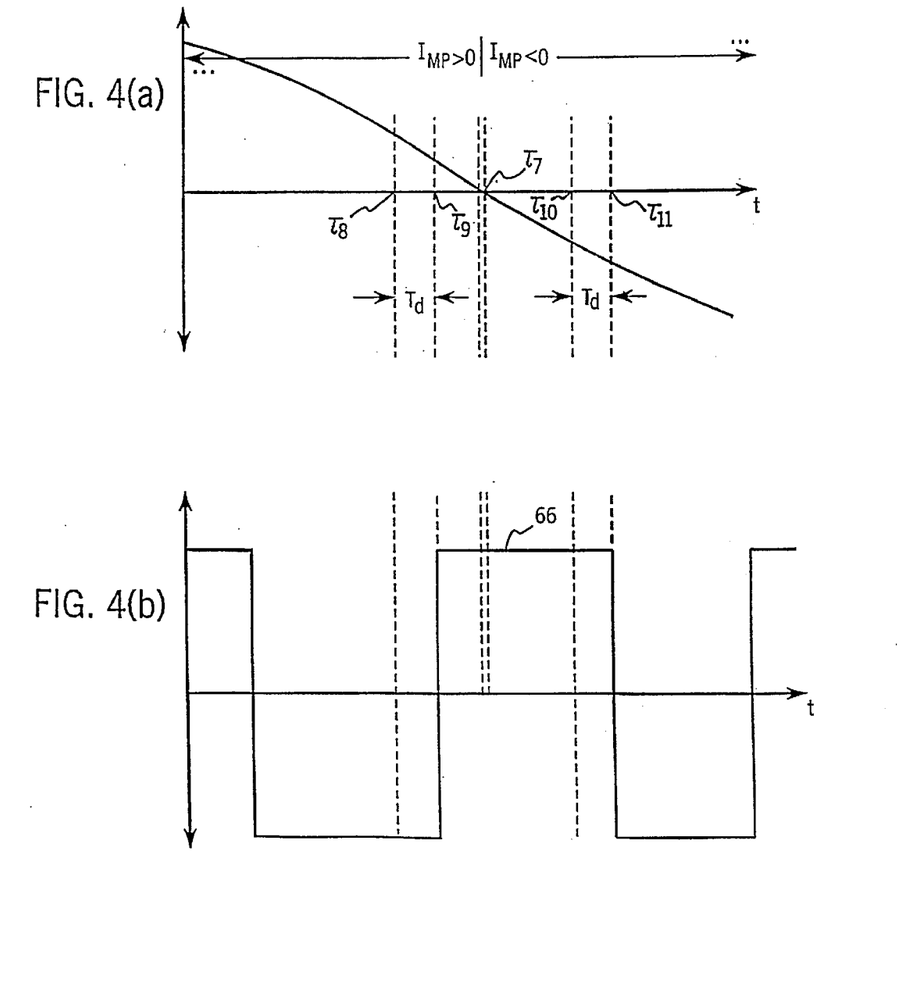
FIG. 4(a) is a graph illustrating stator winding current near a zero crossing and FIG. 4(b) is a graph illustrating high frequency pulses delivered to a motor terminal.

Referring now to FIGS. 4(a) and 4(b), FIG. 4(a) depicts an exemplary terminal current which crosses zero and changes polarity at $\tau_7$ while FIG. 4(b) illustrates how a high frequency terminal voltage pulse train is altered when the terminal current changes polarity. Between times $\tau_8$ and $\tau_9$, a turn on delay period $T_d$ exists during which both switches 12 and 13 are open. Because this turn on delay period $T_d$ takes place while the terminal current 34 is positive prior to time $\tau_7$, the high frequency voltage pulse 66 remains low. This polarity is stored by the controller. Next, at $\tau_9$, switch 12 closes and terminal 28 is connected to the positive DC rail so that the high frequency voltage pulse goes high. While the high frequency voltage pulse is high, referring to FIG. 4(a), the terminal current 34 crosses through zero at $\tau_7$ and changes polarity. Between times $\tau_{10}$ and $\tau_{11}$, another turn on delay period $T_d$ takes place. However, because time $\tau_{10}$ occurs after $\tau_7$ when the terminal current 34 is negative, rather than go low during this turn on delay $T_d$ the high frequency voltage pulse train 66 remains high as current travels through upper diode 44 connecting terminal 28 to the positive DC bus 40.

During this turn on delay period $T_d$ the controller again checks the polarity of the high frequency voltage pulse 66. By comparing of the high frequency voltage pulse during this turn on delay period $T_d$ to the polarity during the previous turn on delay period $T_d$, the controller can determine that a zero crossing occurred between $\tau_9$ and $\tau_{10}$. Thus, a fairly accurate assessment of the zero crossing point $\tau_7$ can be ascertained by taking small glimpses at the high frequency voltage pulse during consecutive turn on delay periods.

Figure 6:
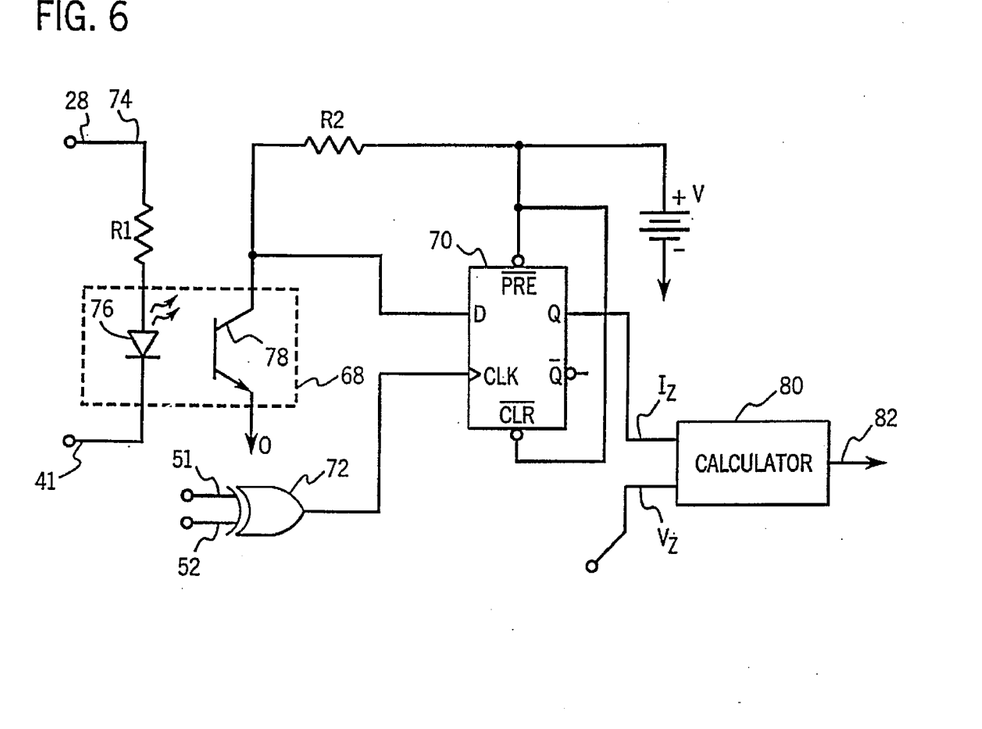
FIG. 6 is a schematic of a first embodiment of the present invention.

Referring now to FIG. 6, a first embodiment of a circuit used to determine terminal zero crossing times from the high frequency terminal voltage pulse train can be observed. This preferred circuit includes an opti-coupler 68, a D flip-flop 70, a NOR gate 72, and a plurality of other common electrical components. A lead 74 connected to terminal 28 provides the high frequency terminal voltage pulse train through a first resistor R1 to the opti-coupler 68. The opti-coupler 68 includes a light emitting diode 76 and a transistor 78 with a light receiving base. The diode and transistor operate together to provide a signal at the D input of the D flip-flop 70 when the terminal current at terminal 28 is high. An additional DC voltage source provides voltage through a second resistor R2 to the transistor 78 for generating signals at the D input. The NOR gate 72 receives both the upper and lower trigger signals (see FIGS. 3(a) and 3(b)) and provides an output signal which is high only when both the upper and lower trigger signals are low. Thus, the output of the NOR gate 72 indicates when a turn on delay period $T_d$ exists. The output of the NOR gate 72 is connected to the clock input of the flip-flop 70. The D flip-flop 70 acts as a storage device which stores the polarity of the terminal voltage signal from line 74. Because the clock is connected to the output of the NOR gate 72, the value stored in the flip-flop 70 can change only during turn on delay periods.

Thus, the flip-flop value will remain constant until the terminal current at terminal 28 changes between two turn on delay periods. Any change in terminal current will be reflected in the q output of the flip-flop and any damage will reflect a current zero crossing. The current zero crossing $I_z$ provided at the Q-output is provided to calculator 80 along with a voltage zero crossing $V_z$ and the calculator determines the current phase angle from the different crossing times according to Equation 1 above and outputs the phase angle $\Phi$ on line 82.

Figure 7:
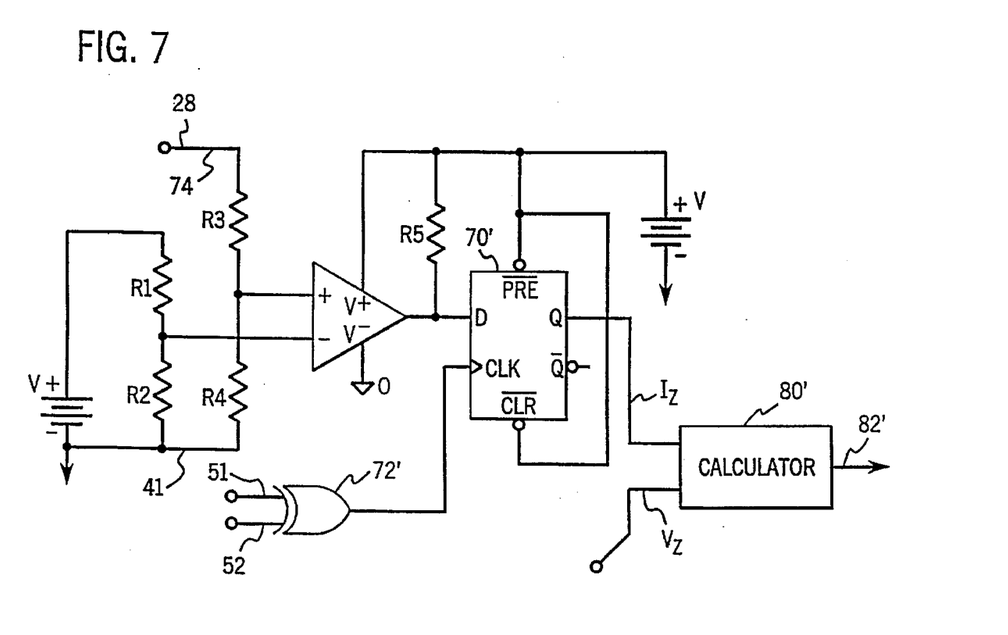
FIG. 7 is a schematic of a second embodiment of the present invention.

Referring now to FIG. 7, the second preferred embodiment of the inventive current zero crossing detector is similar to the embodiment shown in FIG. 6 except that an operational amplifier comparator is used instead of the opti-coupler to determine current zero crossings. Common elements in the second embodiment are labeled with identical numbers followed by primes. Operation of the embodiment in FIG. 7 should be obvious to one of ordinary skill in the art and therefore, will not be explained here in detail. The embodiment shown in FIG. 6 is preferred where high and low voltage sides of the detection mechanism should be insulated.

It should be understood that the above described embodiments are simply illustrative of the principles of the invention. Various other modifications and changes may be made by those skilled in the art which will embody the principles of the invention and fall within the spirit and scope thereof. For example various different circuits could be used to determine when turn on delay periods exist and to determine the polarity of the high frequency voltage pulses. In order to apprise the public of the many embodiments that may fall within the scope of the invention the following claims are made.

We claim:

1. A method to be used with a motor controller having an inverter which provides a high frequency voltage sequence on each of three phases of an AC motor, a changing average value of the voltage sequence generating a low frequency alternating voltage and an associated alternating current which lags the alternating voltage by a current angle, the inverter controlled by a series of triggering pulses characterized by turn on delay periods, the method for determining zero crossing times of the alternating current on a single monitored phase, the method comprising the steps of:

identifying the occurrences of turn on delay periods on the monitored phase;

sensing the voltage sequence on the monitored phase during the turn on delay periods; and determining the current zero crossings from the sensed voltage sequence during the turn on delays periods.

2. The method as recited in claim 1 wherein the controller includes a generator and the inverter has three separate legs, each leg receiving DC voltage from a DC voltage supply and producing a separate voltage sequence on one of said three phases, the generator providing upper and lower trigger signals to each leg, each of the trigger signals being either in an ON state or an OFF state, the signal states being generated in an alternating sequence such that when one signal is ON, the other is OFF, said turn on delay periods being between the time when one signal goes OFF and the other signal goes ON during which both signals are OFF, during turn on delays the alternating voltage produced by a leg being a first polarity when the alternating current is negative and a second polarity opposite the first polarity when the alternating current is positive, the step of identifying the occurrence of turn on delay periods including the step of (a) detecting first and second turn on delay periods having first and second termination times respectively, the step of sensing the voltage sequence including the step of (b) sampling the voltage sequence during the first and second turn on delay periods producing first and second sampled voltages, and the step of determining the current zero crossings including the steps of:

(c) determining the polarities of the first and second sampled voltages;

(d) comparing the polarities of the first and second sampled voltages and:

where the polarities are different, storing the termination time of the first turn on delay period as a current zero crossing time and;

where the polarities are the same, repeating steps (a) through (d) with the second turn on delay period as the first turn on delay period and the next consecutive turn on delay period as the second turn on delay period.

3. The method as recited in claim 2 wherein the first polarity is high and the second polarity is low.

4. The method as recited in claim 1 wherein the step of identifying the occurrences of turn on delay periods includes the step of determining when each of the upper and lower signals provided to the leg associated with the monitored pulse are low.

5. The method of claim 1 wherein the current zero crossing is used to determine the current phase angle, the motor controller monitors the voltage zero crossing times of the monitored phase, the high frequency voltage sequence is characterized by an operating frequency, and the method further includes the steps of, prior to determining the current zero crossing time, determining the voltage zero crossing time immediately preceding the current zero crossing time and, after determining the current zero crossing time, subtracting the voltage zero crossing time from the current zero crossing time to produce an interval, and mathematically combining the interval with the operating frequency to determine the current phase angle.

6. The method as recited in claim 5 wherein the step of mathematically combining includes multiplying the interval by the operating frequency and 360° to produce the current angle.

7. A method to be used with a motor controller for controlling a three phase motor, the controller including a generator and an inverter having three separate legs, each leg of the inverter receiving DC voltage from a DC voltage supply and producing a high frequency voltage sequence, a changing average value of the pulse train generating a low frequency alternating voltage and an associated alternating current which lags the alternating voltage by a current angle, the generator providing upper and lower trigger signals to each leg, each of the signals being either in an ON state or an OFF state, the signal states being generated in an alternating sequence such that when one signal is ON, the other is OFF a turn on delay period between the time when one signal goes OFF and the other signal goes ON during which both signals are OFF, during turn on delay period the alternating voltage produced by a leg being high when the alternating current is negative and being low when the alternating current is positive, the method for determining the zero crossing times of the alternating current on a single monitored phase, the method comprising the steps of:

(a) detecting a first turn on delay period;

(b) sampling the voltage sequence during the first turn on delay period producing a first sampled voltage;

(c) determining the polarity of the first sampled voltage;

(d) detecting a second turn on delay period which immediately follows the first turn on delay period;

(e) sampling the voltage sequence during the second turn on delay period producing a second sampled voltage;

(f) determining the polarity of the second sampled voltage;

(g) comparing the polarities of the first and second sampled voltages and:

where the polarities are different, storing the termination time of the first turn on delay period as a current zero crossing time and;

where the polarities are the same, repeating steps (a) through (g) with the second turn on delay period as the first turn on delay period and the next consecutive turn on delay period as the second turn on delay period.

8. The method as recited in claim 7 wherein the step of detecting the turn on delay periods includes the step of determining when each of the upper and lower signals provided to said monitored phase are low.

9. The method of claim 7 wherein the current zero crossing is used to determine the current phase angle, the motor controller monitors the voltage zero crossing times of the monitors phase, the high frequency voltage sequence is characterized by an operating frequency, and the method further includes the steps of, prior to determining the current zero crossing time, determining the voltage zero crossing time immediately preceding the current zero crossing time and, after determining the current zero crossing time, subtracting the voltage zero crossing time from the current zero crossing time to produce an interval, and multiplying the interval by the operating frequency and 360 degrees to produce the current angle.

10. An apparatus to be used with a motor controller having an inverter which provides a high frequency voltage sequence on each of three phases of an AC motor, a changing average value of the voltage sequence generating a low frequency alternating voltage and an associated alternating current which lags the alternating voltage by a current angle, the inverter controlled by a series of triggering pulses characterized by turn on delay periods, the method for determining zero crossing times of the alternating current on a single monitored phase, the apparatus comprising:

a detector for identifying the occurrences of turn on delay periods on the monitored phase;

a sensor for sensing the voltage sequence on the monitored phase during the turn on delay periods; and a calculator for determining the current zero crossings from the sensed voltage sequence and the turn on delay periods.

11. The apparatus as recited in claim 10 wherein the controller includes a generator and the inverter has three separate legs, each leg receiving DC voltage from a DC voltage supply and producing a separate voltage sequence on one of said three phases, the generator providing upper and lower trigger signals to each leg, each of the trigger signals being either in an ON state or an OFF state, the signal states being generated in an alternating sequence such that when one signal is ON, the other is OFF, said turn on delay periods being between the time when one signal goes OFF and the other signal goes ON during which both signals are OFF, during turn on delays the alternating voltage produced by a leg being a first polarity when the alternating current is negative and a second plurality opposite the first polarity when the alternating current is positive, the controller controlling a polarity of apparatus components including the detector which detects first and second turn on delay periods having first and second termination times respectively, the sensor which samples the high frequency alternating voltage sequence during the first and second turn on delay periods producing first and second sampled voltages, and the calculator which includes a first calculating means for determining the polarities of the first and second sampled voltages and a comparator for comparing the polarities of the first and second sampled voltages and, the calculator continuously compare the polarity of the voltage sequence during consecutive turn on delay periods, the controller storing the termination time of the earlier of two compared polarities when the two polarities are different.

12. The apparatus as recited in claim 1 wherein the first polarity is high and the second polarity is low.

13. The apparatus as recited in claim 10 wherein the detector for identifying the occurrences of turn on delay periods detects when each of the upper and lower signals provided to the leg associated with the monitored phase are low.

14. The apparatus of claim 10 wherein the current zero crossing is used to determine the current phase angle, the motor controller monitors the voltage zero crossing times of the monitored phase, the voltage sequence is characterized by an operating frequency, and the apparatus further includes a subtractor for subtracting a voltage zero crossing time from a consecutive and following current zero crossing time to produce an interval, and an operator for mathematically combining the interval with the operating frequency.

15. The apparatus as recited in claim 14 wherein the operator mathematically combines by multiplying the interval by the frequency to produce a first value and then multiplying the first value by 360 to produce the current phase angle.

* * * * *